Feb. 9, 1932.  F. C. GOLDSMITH  1,844,385
DEVICE FOR HANDLING PIPE
Filed Jan. 7, 1929   3 Sheets-Sheet 3
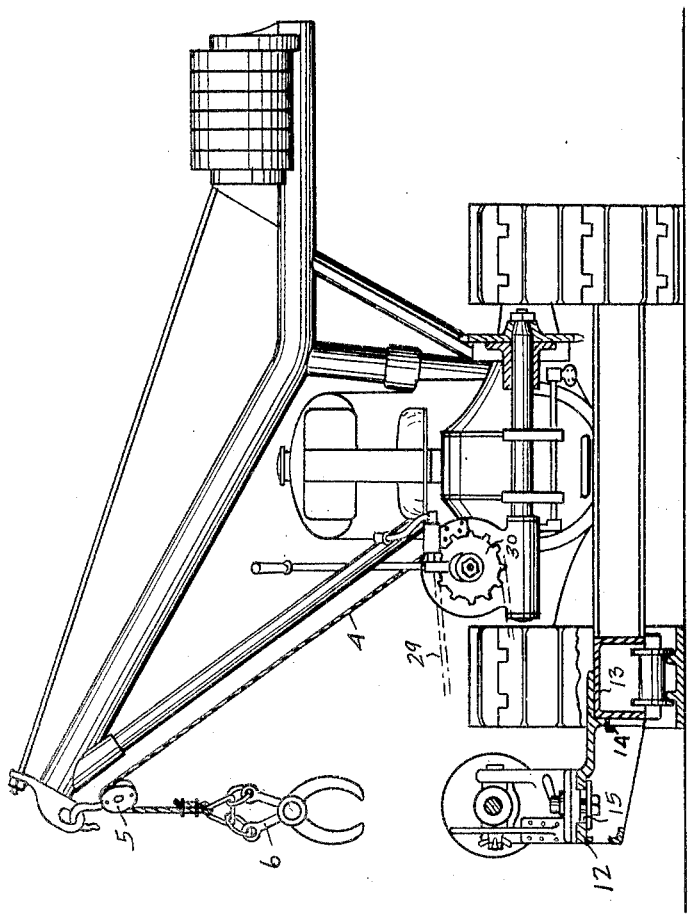

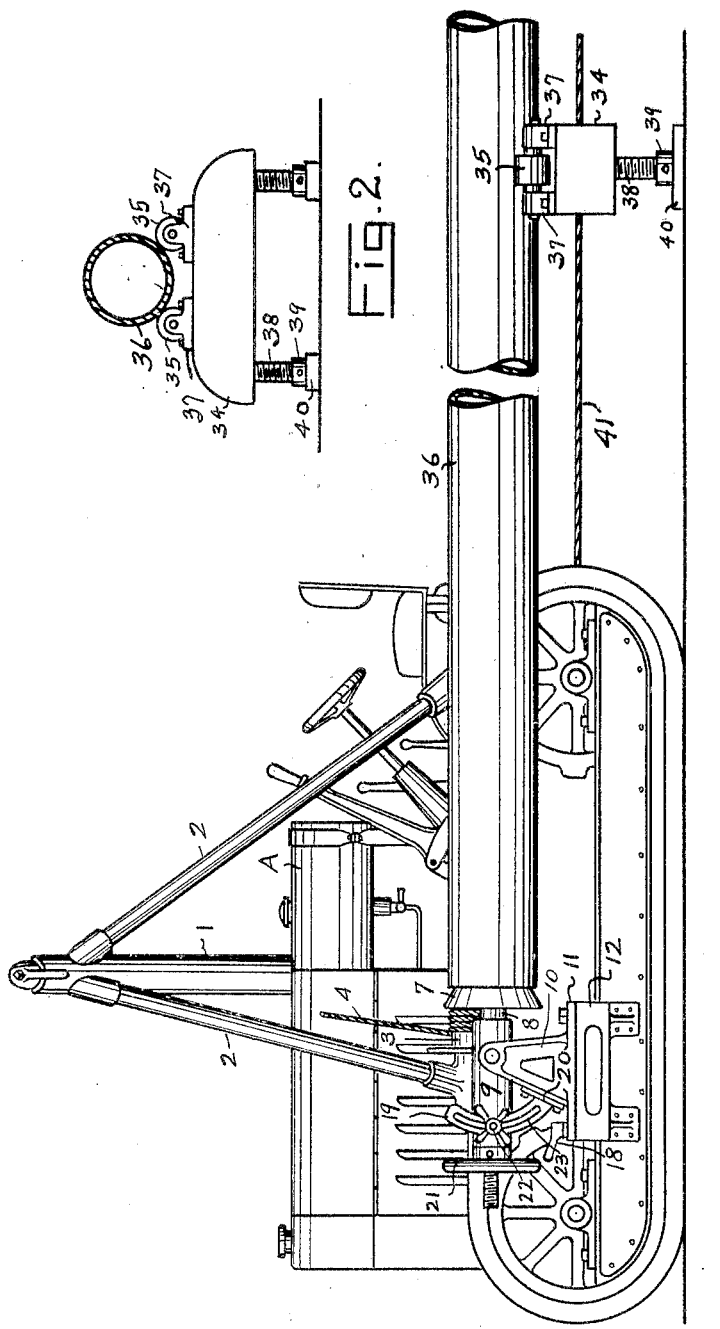

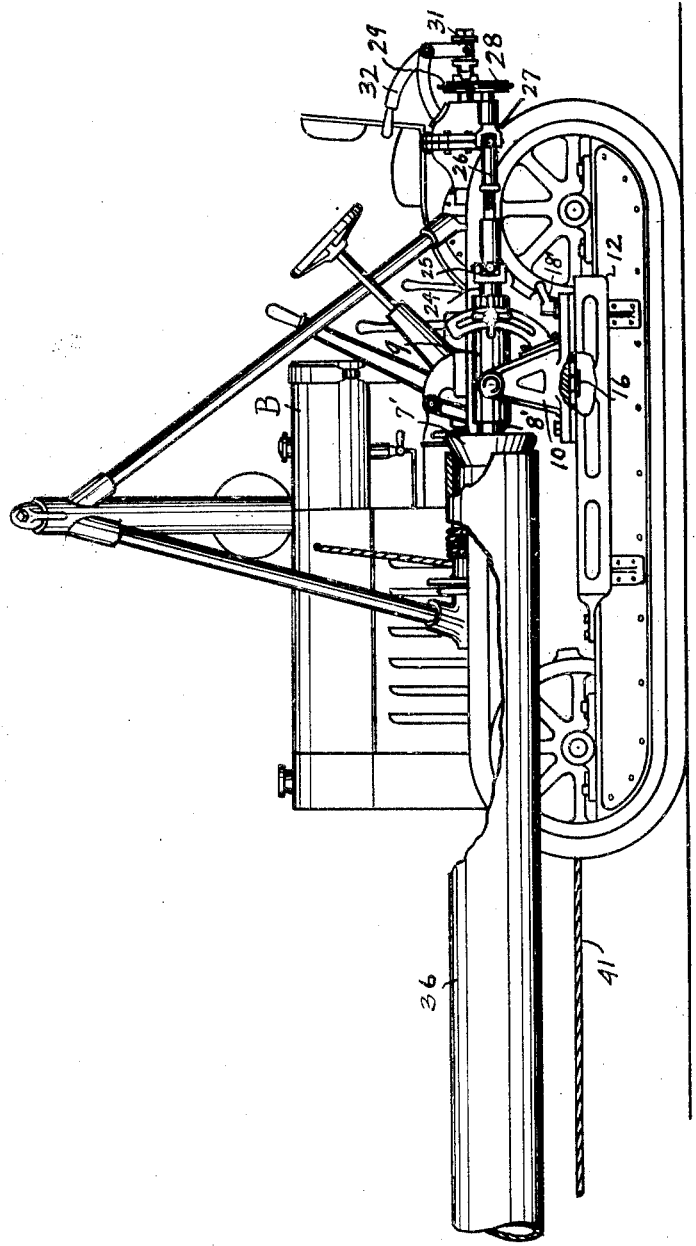

Patented Feb. 9, 1932

1,844,385

UNITED STATES PATENT OFFICE

FRED C. GOLDSMITH, OF HOUSTON, TEXAS

DEVICE FOR HANDLING PIPE

Application filed January 7, 1929. Serial No. 330,718.

My invention relates to devices for handling pipe in the construction or repair of pipe lines, and particularly for supporting and rotating pipe in oil and gas field work.

In laying pipe for conducting oil, gas, water and the like, it is common to dig the ditch in which the pipe is to be laid and unload the sections of pipe along the edge of the ditch and then lay the pipe and weld the ends together. Sometimes several sections of pipe are welded together out of the ditch. The longer sections thus resulting are cleaned, coated with asphalt, tar, or other preferred coating and then also wrapped with paper or felt before being dropped into the ditch for welding together. This operation must be done by hand and is a laborious job and it is extremely difficult to keep the pipe clean and to properly coat and wrap it.

It is an object of my invention to provide an apparatus whereby the pipe sections may be easily handled and operated upon for cleaning and coating and wrapping, even where the sections are of some length, as where several ordinary sections are welded together.

I desire to provide means of a movable nature which can support the pipe at each end in such manner that the pipe may be rotated while it is being operated upon.

I prefer to employ a plurality of vehicles such as tractors, trucks or the like upon which supporting chucks are arranged to engage within the pipe extremities and to provide means to lift the pipe from the ground so that the rotating means may be engaged with said pipe.

I aim to provide vehicles separately movable to engage opposed ends of the pipe so that it can be operated upon, even when uneven ground is encountered.

In the drawings herewith a preferred embodiment of the invention is shown although it is to be understood that other types of vehicles may be employed whether power operated or not.

Fig. 1 is a side elevation of one of the vehicles employed in supporting one end of the pipe.

Fig. 2 is a front elevation of one of the intermediate supports which may be employed.

Fig. 3 is a view similar to Fig. 1 showing the second vehicle employed to engage the other end of the pipe and communicate rotation thereto.

Fig. 4 is an end view of the Fig. 3 device.

The vehicles employed must be portable and may be mounted on wheels. I have shown two vehicles of the power driven type ordinarily termed caterpillar tractors. It is contemplated that the pipe may be engaged and supported by one of the tractors and then the other will be adjusted into position to engage the opposite end of the pipe.

The particular construction of the vehicles employed for supporting the pipe is immaterial so far as my invention is concerned, it being merely necessary that some supporting vehicle be employed which is movable along the ditch to engage and raise the pipe and rotate it.

In Fig. 1, I have shown a tractor, which may be indicated generally at A, and in Fig. 3, I have shown a second tractor B of similar construction. It is intended in this particular embodiment of the invention to employ these two tractors in combination but it is easily seen that one of these vehicles at least could easily be an ordinary trailer, or other supporting device, capable of being transported from place to place along the ditch. In the Fig. 1 construction, the tractor frame is employed to support a boom 1, having supporting braces 2 therefor, the boom extending laterally from the side of the vehicle toward the place where the pipe is lying. A winch, shown at 3, is mounted below the boom and it is to be understood that this winch may be operated to reel up or unreel a cable 4, which may pass over a pulley 5, see Fig. 4, upon the end of the boom and connect with a pipe engaging means 6 at the end of said cable, whereby the pipe may be raised from the ground for engagement with my special pipe support.

The said pipe support comprises a chuck 7, which may be of any preferred type, and, if desired, may be expansible. I contemplate employing any preferred type of chuck now on the market. Said chuck is mounted upon a shaft 8, which is supported in a head 9, pivoted at the upper end of two supporting posts 10. These posts are mounted upon base plates 11, supported upon substantial brackets 12, extending laterally from the frame 13 of the tractor. As will be seen from Fig. 4, the bracket is bolted to the frame by means of bolts or screws 14.

The bracket 12 has a central longitudinal slot 15 therein and the base plate 11 has a post 16 extending downwardly through this slot whereby the base plate may be adjusted longitudinally upon the bracket. It is also to be noted that the post may be swung laterally about the post 16 as a pivot. A bolt or pin 18 at one end of the base plate fits through an arcuate slot in said plate and serves to fix the said plate and the post in adjusted position.

The head 9 of the chuck also engages a lateral arcuate support 19. This support is in the form of a plate secured at 20 to the side of the supporting post and extending upwardly along the side of the head 14. A handwheel 21 on the end of the shaft 8 is provided whereby the position in a vertical plane of said chuck may be accomplished and the chuck may be moved longitudinally. A screw 22 secured in the head 9 and extending through the slot 23 in the bracket enables the operator to fix the chuck in adjusted position so as to engage within the end of the pipe. It is to be understood that the shaft 8 is rotatable within the head 9 so that the pipe will be allowed to rotate when power is applied thereto.

The opposite end of the pipe may be supported on the tractor B and the supporting mechanism at this end is very much the same as in the tractor just described. Arrangement is made, however, to communicate a rotative movement to the chuck 7' so that the pipe may be rotated. This rotative movement is communicated to the shaft 24, which is an extension of the shaft 8', fitting within the head 9. The shaft 24 extends beyond the head 9 and has a universal joint at 25. Beyond the joint the shaft has a slidable connection with a hollow shaft 26 to which the said shaft 24 is splined. Beyond the hollow shaft 26, into which the shaft 24 is telescoped, is a second universal joint 27, and beyond said joint the shaft has mounted thereon a sprocket wheel 28, by means of which rotation may be communicated to the shaft through sprocket chain 29, operatively connected with a drive sprocket 30, driven from the power take-off of the tractor B. The sprocket wheel 30 is idle on the drive shaft of the motor and is operatively connected therewith through a clutch 31 operated through a hand lever 32.

Between the two tractors I may employ a stationary support indicated in Figs. 1 and 2. This device will be employed where the pipe is of such length that an additional support may be necessary between the two tractors. This support will be stationary during operation but it is of such light construction that it may be moved from place to place as the tractors are moved. Said support comprises a supporting body 34 having thereon a pair of spaced rollers 35, upon which the pipe 36 may be supported.

These rollers are mounted in bearing blocks 37. The transverse body member 34 is preferably mounted upon adjustable legs 38 which have a threaded connection with a nut 39 supported upon base blocks 40. These legs are adjustable in the same manner as is an ordinary screw jack and need not be particularly described.

I contemplate using one or more of these supports wherever it becomes necessary through the extreme length of the pipe sections which are to be handled.

In the use of this apparatus it is contemplated that the tractor at one end of the pipe will be driven into position near the end of the pipe section. The pipe engaging device 6 will be lowered and secured about the pipe and the cable will be reeled up so as to raise and throw the end of the pipe around into a position adjacent the chuck 7. The tractor will then be moved so as to engage the said chuck in the end of the pipe as it is suspended from the cable 4. In thus inserting the chuck 7 into the end of the pipe it may be necessary to move the chuck 7 in the manner already indicated and it will be possible to move the chuck in either a vertical or horizontal plane, or both, through the adjusting devices which have already been described.

When the chuck has thus been engaged in the pipe the other tractor will be then moved to a position adjacent the other end of the pipe, the pipe will be lifted and drawn toward the chuck by means of the cable, as previously explained, and the chuck will be adjusted so as to fit within the end of the pipe. If it is necessary to move the chuck into the end of the pipe by means other than the movement of the tractor itself, this can be accomplished by the longitudinal adjustment of the supporting posts 10 relative to the supporting bracket 12, as will be understood from the drawings that the hand wheel 21 may be suitably turned to tighten the chuck; and when the position of the chuck in the end of the pipe has been accomplished the nut 18′ may be tightened to hold the parts in proper engagement.

When thus mounted upon the pipe engaging means the pipe may be rotated through the driving mechanism connected with the tractor B in the manner already described.

When the pipe is thus rotated it will be possible to operate upon the same with cleaning devices of any desired character; brushes or scraping members, or other tools may be employed, and with the pipe thus mounted and rotated the cleaning will be easily accomplished. It is also possible to apply the coating much more readily to the pipe with it thus supported and rotated and after the coating has been applied a wrapping may be readily wound about the pipe, and, if desired, a further coating may be applied on top of the wrapping.

By using this device in the field it will be possible to clean and apply a protective coating to the pipe rapidly and much more effectively than could be done by hand in the old manner. My invention resides broadly in the idea of supporting the pipe at each end by separate portable devices in such manner that such rotation may be communicated to the pipe for operating thereon before the pipe is placed in the ditch for welding into connection with adjacent sections. The advantages of this device for field work particularly will be obvious to those having previous experience with handling and protecting pipe of this nature; and it is to be observed in this connection that the rear supporting vehicle B may be connected to the front vehicle or tractor A by a suitable draft cable 41 through which said rear vehicle may be pulled along in case the vehicle B employed is not self-propelled.

What I claim as new is:

1. A device for supporting and rotating pipe including a plurality of vehicles, pipe engaging devices on each vehicle, and means to rotate one of said devices and said pipe.

2. A device for supporting and rotating pipe including a plurality of vehicles, pipe engaging devices on each vehicle, and means supported on one of said vehicles to rotate one of said devices and said pipe.

3. A device for supporting and rotating pipe including a plurality of vehicles, pipe engaging devices on each vehicle, and means mechanically operated and connected with one of said vehicles to propel said vehicle and to rotate one of said devices and said pipe.

4. Means to engage and support a pipe along the ditch including a pair of vehicles, means on one of said vehicles to rotatably support one end of said pipe, and means on the other vehicle to engage and communicate rotation to said pipe.

5. Means to engage and support a pipe along the ditch including a pair of vehicles, means on one of said vehicles to rotatably support one end of said pipe, and means on the other vehicle to engage and communicate rotation to said pipe, said last named means being adjustable along said vehicle.

6. A pair of vehicles, means thereon to engage the ends of a pipe, means to rotate one pipe engaging means, said pipe engaging means being adjustable vertically on said vehicles.

7. A vehicle, a pipe engaging chuck thereon, means to raise the pipe, means to adjust said chuck to engage said pipe, and means to rotate said chuck.

8. A vehicle, a pipe engaging chuck thereon, means to raise the pipe, means to adjust said chuck to engage said pipe, and means on said vehicle to rotate said chuck.

9. A power driven vehicle, means thereon to grip and lift a pipe, means adapted to engage within the end of a pipe section, operable from the power of said vehicle, and means to rotate said pipe-engaging means and said pipe.

10. A power driven vehicle, means thereon to grip and lift a pipe, means adapted to engage within the end of a pipe section and adjustable on said vehicle in various directions to engage or release the same, and means to rotate said pipe engaging means.

11. The combination of a chuck to engage within the ends of pipe sections, portable means to support said chuck, means to dispose a section of pipe in operative relation with the chuck, and means to rotate said chucks and said pipe.

12. The combination of two vehicles, pipe engaging chucks thereon, means to swing said chucks in both vertical and horizontal planes, means to adjust said chucks longitudinally on said vehicles and means to rotate said chucks.

13. A device for supporting and rotating pipe including a plurality of vehicles, pipe engaging devices on said vehicles, means to rotate one of said devices and said pipe and draft means connecting said vehicles.

14. A device for supporting and rotating pipe, including a front and rear vehicle, a pipe engaging device on each vehicle means to rotate the device on the rear vehicle and means through which said rear vehicle may be propelled.

15. A device for handling pipe in the field including a portable frame, a trailer connected with said frame, means to move said frame and said trailer, means on said frame to engage and lift a pipe, chucks adapted to be inserted within the ends of said pipe, and means to rotate said chucks.

16. In combination, a portable supporting apparatus, pipe engaging means thereon, means to move said pipe into position for engagement by said means, and means on said apparatus to rotate said pipe engaging means and said pipe, said supporting apparatus including a tractor and trailer each arranged to carry a portion of said pipe engaging means.

17. In combination, a portable supporting apparatus, pipe engaging means thereon, means to move said pipe into position for engagement by said means, and means on said apparatus to rotate said pipe engaging means and said pipe, said apparatus including a crawler type tractor and a frame arranged out-board of the crawler tracks to support said pipe engaging means.

In testimony whereof I have signed my name to this specification.

FRED C. GOLDSMITH.